United States Patent [19]
Ramsey

[11] Patent Number: 5,398,722
[45] Date of Patent: Mar. 21, 1995

[54] AUTOMATIC CONTROL VALVE AND METHOD

[76] Inventor: P. S. Ramsey, P.O. Box 2111, Birmingham, Ala. 35201

[21] Appl. No.: 188,717

[22] Filed: Jan. 31, 1994

[51] Int. Cl.⁶ ............................................. F16K 24/00
[52] U.S. Cl. ................................... 137/587; 137/400; 137/432; 137/448
[58] Field of Search ................. 137/429, 448, 43, 587, 137/400, 432

[56] References Cited

U.S. PATENT DOCUMENTS

| | | | |
|---|---|---|---|
| 979,807 | 12/1910 | Squires | 137/429 |
| 1,689,066 | 10/1928 | Baxter . | |
| 1,724,878 | 8/1929 | Jensen | 137/43 |
| 2,429,280 | 10/1947 | Scully et al. | 137/587 |
| 3,078,867 | 2/1963 | McGillis et al. | 137/448 |
| 3,563,263 | 2/1971 | Benson | 137/202 |
| 4,098,307 | 7/1978 | Taylor | 141/220 |
| 4,457,327 | 7/1984 | Green | 137/43 |
| 4,735,230 | 4/1988 | Detloff | 137/432 |
| 5,027,870 | 7/1991 | Butterfield | 141/198 |

FOREIGN PATENT DOCUMENTS 1528494  7/1968  France ................................. 137/448

*Primary Examiner*—A. Michael Chamber
*Attorney, Agent, or Firm*—Wm. Randall May

[57] ABSTRACT

A compact, self-contained, automatic flow control and venting apparatus for the automatic interruption of liquid flowing into a liquid storage receptacle during the refilling process is disclosed wherein a dual-chambered, offset valve mechanism is controlled by the movement of a float assembly. A bi-directional lever member linked to the float assembly is used to control the movement of the valve mechanism between its open and closed positions. The apparatus also provides for the automatic release of air or vapor from within the receptacle during the refilling process and for the automatic checking of liquid backflow through the valve mechanism.

24 Claims, 3 Drawing Sheets

AUTOMATIC CONTROL VALVE AND METHOD

BACKGROUND OF THE INVENTION

1. Field of the Invention

This invention relates generally to flow control devices, including liquid and gaseous flow control, and more specifically to a new and improved method and apparatus for controlling the flow of liquids into, and gases out of, liquid storage receptacles.

2. Prior Art and Other Considerations

Liquid storage receptacles, particularly large, mobile, unvented tanks such as are commonly used in industry to store and transport liquid fuels and other liquid chemicals are typically refilled from pressurized sources, either in the field or at various refilling locations or stations. Permanent storage receptacles, depending on their location, may be refilled using nonpressurized or gravity feed means.

In both systems, the storage receptacle must be vented in some way during the refilling process to allow internal vapor or air to escape the receptacle as the liquid level in the tank rises. Presently, venting is typically accomplished by independent, permanently installed, venting mechanisms such as manually operated bleed valves. During the refilling process it is advantageous to provide a shut-off mechanism which will prevent overfilling the storage receptacle and thus avoid spillage or leakage of the fuel or other chemical being stored. Prior art devices, such as those disclosed by U.S. Pat. No. 5,027,870 to Butterfield and U.S. Pat. No. 3,563,263 to Benson disclose two general methods of flow control for liquid storage tanks which have been used or attempted in the past.

The Butterfield device utilizes the rising level of liquid within a storage receptacle to activate a dual float system to close a primary or main valve and then a secondary or bleed vane which, in combination, work to stop the flow of liquid into the receptacle. The Butterfield device appears to be designed for low flow or gravity feed systems and would fail to stop the flow of liquid in a pressurized system. Also, there is no provision or mechanism within the device, or otherwise, for venting vapor during the refilling process.

The Benson device, on the other hand, uses a bulb-type float mechanism which is designed to close off the "vent" line of a typical underground storage tank as the level of liquid within the tank rises to a predetermined level. Rising pressure within the tank, upon closure of the vent valve, prevents further introduction of liquid into the tank from the refilling source. The Benson device is not designed to stop the flow of liquid at all and, as with the Butterfield device, would fail to stop the flow of liquid in a pressurized system.

Prior art devices and methods such as those discussed herein, and other similar devices, while perhaps functionally adequate for their designed purpose, are nevertheless generally quite complex in their construction, design and operation, and typically require many moving parts to accomplish their intended function. Many of the prior art devices designed to date are difficult to install and once installed, require periodic adjustments or require the device to be manually reset once its valving mechanism has been triggered. In others, the design is restrictive thereby preventing the use of the device in situations where the flow rate is high or the liquid is pressurized. Other problems with the prior art include the inability to provide a means for the recovery of vapor, if desired, and the inability of the device to effectively operate in an inclined or off-center position such as is typically encountered in the field where tankers or heavy equipment may be resting on unlevel ground or otherwise oriented in a tilted or off-center position.

It would be expedient, therefore, for the provision of a simplified, self-contained, method and apparatus for the automatic control of liquid flowing into storage receptacles and which also provides for the safe and effective release of vapor during the refilling process. It would also be expedient for said device to be quickly and easily installed or removed, to be extremely durable and to be able to operate under high pressure and high flow rates and in off-center positions typically encountered in the field.

SUMMARY OF THE INVENTION

The present invention is directed to a method and apparatus which satisfies the needs defined in the preceding section. In view of the foregoing, it is a primary object of this invention to provide simplified method and apparatus for a self-contained, high pressure, high volume, extremely durable, automatic control valve system which can be used to fill and vent virtually any unvented (or vented) liquid storage receptacle. The control valve system is designed primarily for mobile liquid storage receptacles such as transport tankers and heavy equipment fuel tanks but can also be used with stationary receptacles such as underground fuel or chemical tanks where line pressure to the receptacle is not constant. The device is designed to be quickly installed and can be removed from old equipment or receptacles and transferred to new equipment or receptacles within minutes.

An advantage of the present invention is the provision of a durable and very reliable method and apparatus for automatic control of the flow of liquid into a storage receptacle wherein the control mechanism will safely and effectively operate even when the storage receptacle is resting on an unlevel or uneven surface or is otherwise sitting in a tilted position.

An advantage of the present invention is the provision of an automatic flow control method and apparatus which can be quickly mounted to, and used with, mobile equipment or receptacles or with permanent receptacles and which eliminates overfills and spillage during the refilling process.

Another advantage of the present invention is the provision of method and apparatus for a durable, efficient, virtually maintenance free, flow control system which also allows for the release and recovery of vapor during the refilling process.

Another advantage of the present invention is its ability to effectively handle liquid flow rates of up to 150 gallons per minute while providing for the venting of the target receptacle and for the automatic shut-off of liquid flow during the refilling process.

A further advantage of the present invention is the provision of method and apparatus for an automatic flow control system which can be quickly and easily installed and removed, even while the target receptacle is full of liquid.

A further advantage of the present invention is the provision of a method and apparatus for the automatic control of the flow of liquid into a storage receptacle in which the operation of the apparatus is totally mechanical and does not require adjustment once installed.

According to an embodiment of the invention, a self-contained, automatic flow control mechanism for attachment to, and use with, liquid storage receptacles comprises a housing means; a mounting means; a dual-chambered, offset valve assembly; a float assembly; a vapor check/release assembly; and a safety valve means. The working components of the mechanism, i.e. the valve assembly, float assembly, vapor check/release assembly and the safety valve means, are all operably connected to and/or housed by the housing means to create a compact, self-contained working unit. The unit can be quickly and easily installed onto a liquid storage receptacle using the mounting means. When installed, a portion of the mechanism is situated within the interior space of the storage receptacle and a portion is exterior to the receptacle with a common liquid flow passageway being provided therethrough. The operation of the mechanism's valve assembly is controlled by the float assembly. Generally, as liquid is introduced through the mechanism and into an empty receptacle, the rising level of liquid within the receptacle causes, at some predetermined point, the float assembly to engage a pivot mechanism to close the offset valve assembly thereby shutting off the flow of liquid into the storage receptacle. The vapor check/release assembly provides for the release or recovery of vapor during the refilling process and ensures the proper operation of the mechanism in situations where the storage receptacle is not in a perfectly upright position. The safety valve means provides a secondary means for the release of pressure from within the receptacle during the refilling process.

More particularly, the housing means comprises a tubular sleeve having a top plate rigidly attached thereto. This top plate receives and secures the vapor check/release assembly, the safety valve means and an inlet tube. The valve and float assemblies operably connect with each other and the inlet tube so as to form or create a common flow passageway through the mechanism into the receptacle. The valve assembly comprises a valve body having an inlet chamber, which attaches directly to the inlet tube, and an offset valve chamber. The offset valve chamber is positioned or situated within the valve body at an approximate 45° angle with respect to the inlet chamber. Liquid being introduced through the inlet tube flows first through the inlet chamber of the valve body and then through the offset valve chamber. The offset valve chamber is provided with a hinged valve disc which closes in the direction of the flow of liquid through the mechanism and is pivotally connected to, and operated by, the float assembly. The offset orientation of the valve chamber within the valve body is designed to reduce wear and extend the life of the valve by shortening the distance the valve disc must travel during its closing operation thereby greatly reducing the velocity and impact pressure of the valve disc upon its seat. The positioning of the valve chamber, while greatly extending the life of the valve, has little effect on the flow rate of the mechanism. The float assembly comprises a float tube and a float means with the float tube being in flow communication with the valve assembly and the inlet tube. The float means comprises a weighted, buoyant float body which is pivotally linked at its upper end to the valve disc within the offset valve chamber and is in slidable communication with the float tube. As the level of liquid within the receptacle rises and falls, the float means is caused to slide up and down the exterior surface of the float tube within the space of the housing means. The up and down movement of the float means causes movement of a lever means which triggers the opening and closing of the valve disc within the valve assembly. The vapor check/release assembly comprises a vent valve and a check valve. The vent valve allows the vapor from within the storage receptacle to escape (or, if desired, to be recovered) as the receptacle is being filled with liquid. The vent valve also prevents the introduction of dirty or tainted air into the storage receptacle during periods when venting is not required. The check valve prevents the backflow of liquid through the vent valve in the event the storage receptacle is situated in an extremely tilted position. The safety valve means comprises a pressure sensitive plug which is designed to relieve rising pressure from within the storage receptacle in the event liquid backflow prevents the receptacle from being vented through the vent valve. The invention can be installed on virtually any liquid storage receptacle by simply cutting an appropriately sized hole into the top of the vessel and by aligning and sealably attaching the mounting means thereto. The self-contained flow control unit can then be made operable by sliding the unit through the opening in the receptacle and securing the unit to the mounting means.

In operation, as the liquid within the storage receptacle is used or is allowed to leave the receptacle, the falling liquid level within the receptacle causes the float means to slide down the float tube. The downward movement of the float means pulls on the linkage between the float assembly and the lever means of the valve assembly thereby causing the lever means to pivot the valve disc within the valve assembly to its open position. The weight of the float means and linkage, when there is no incoming line pressure on the valve disc, being sufficient to overcome the valve disc's normal tendency to close. In order to refill the storage receptacle, liquid is introduced through the inlet tube of the present invention. The liquid then flows through the inlet chamber of the valve assembly, through the open valve of the offset valve chamber, through and out of the float tube and into the storage receptacle. During this operation, vapor or air from within the receptacle is allowed to freely vent through the check and vent valves. As the level of liquid within the storage receptacle approaches capacity, the float means of the float assembly is thereby caused to be buoyed upwardly with the float tube acting as a guide. At a predetermined capacity level, the rising float causes, and then allows, the float linkage attached to the top of the float means to move slightly upward. This action causes the valve disc lever to again pivot thereby initiating the closure of the valve disc against its seat thereby shutting off the flow of liquid into the storage receptacle. The valve disc, once slightly pivoted on its hinge, will tend to close under its on weight, however, movement of liquid through the valve body also assists in the closure of the valve disc. As a precautionary measure, failsafe linkage is attached between the float means of the float assembly and the lever means of the valve assembly in a manner which causes the valve disc to automatically close in the event the float linkage between the float means and the lever means breaks or the float means otherwise becomes detached from the lever means.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
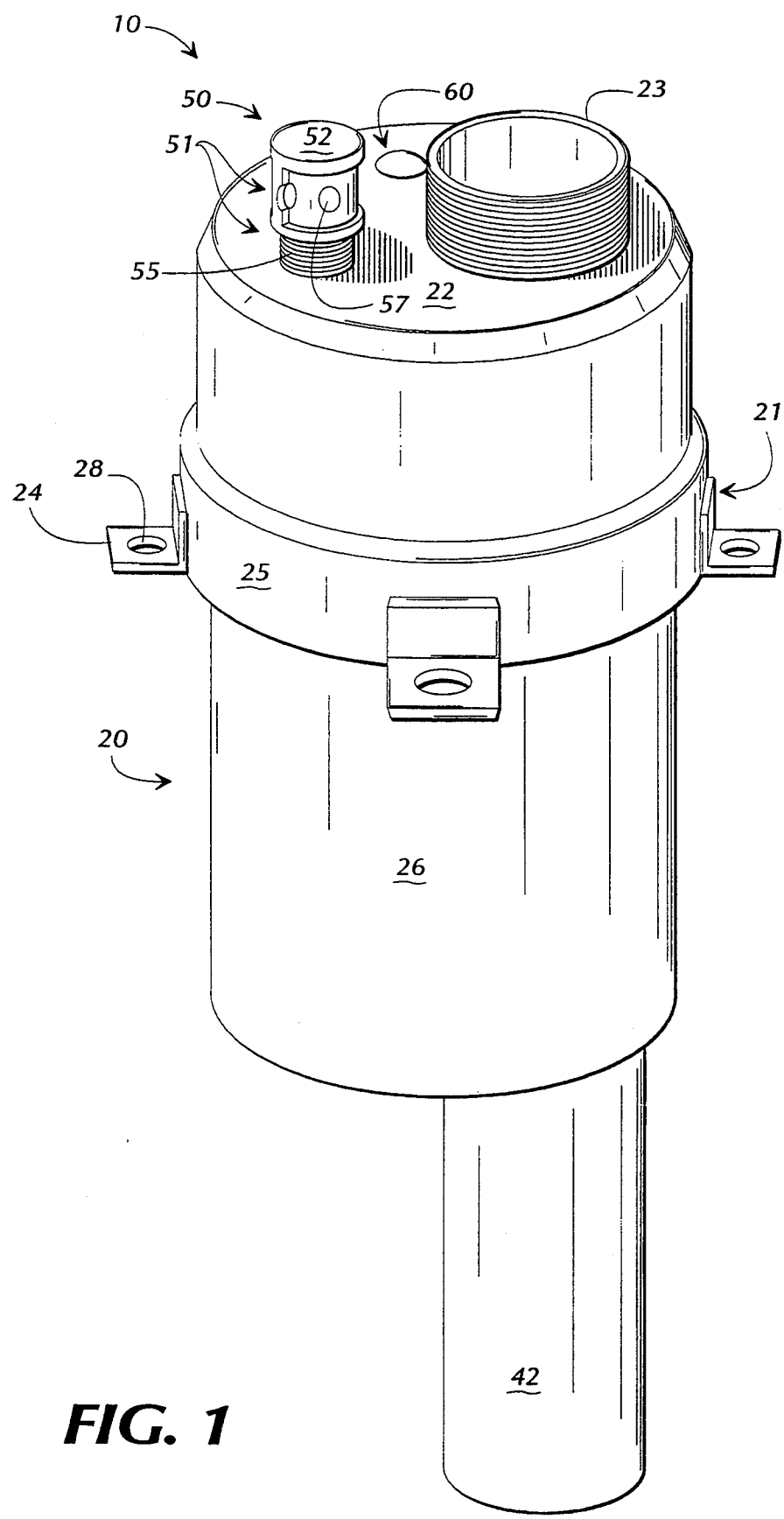
FIG. 1 is a perspective view of an embodiment of the invention.
Figure 2:
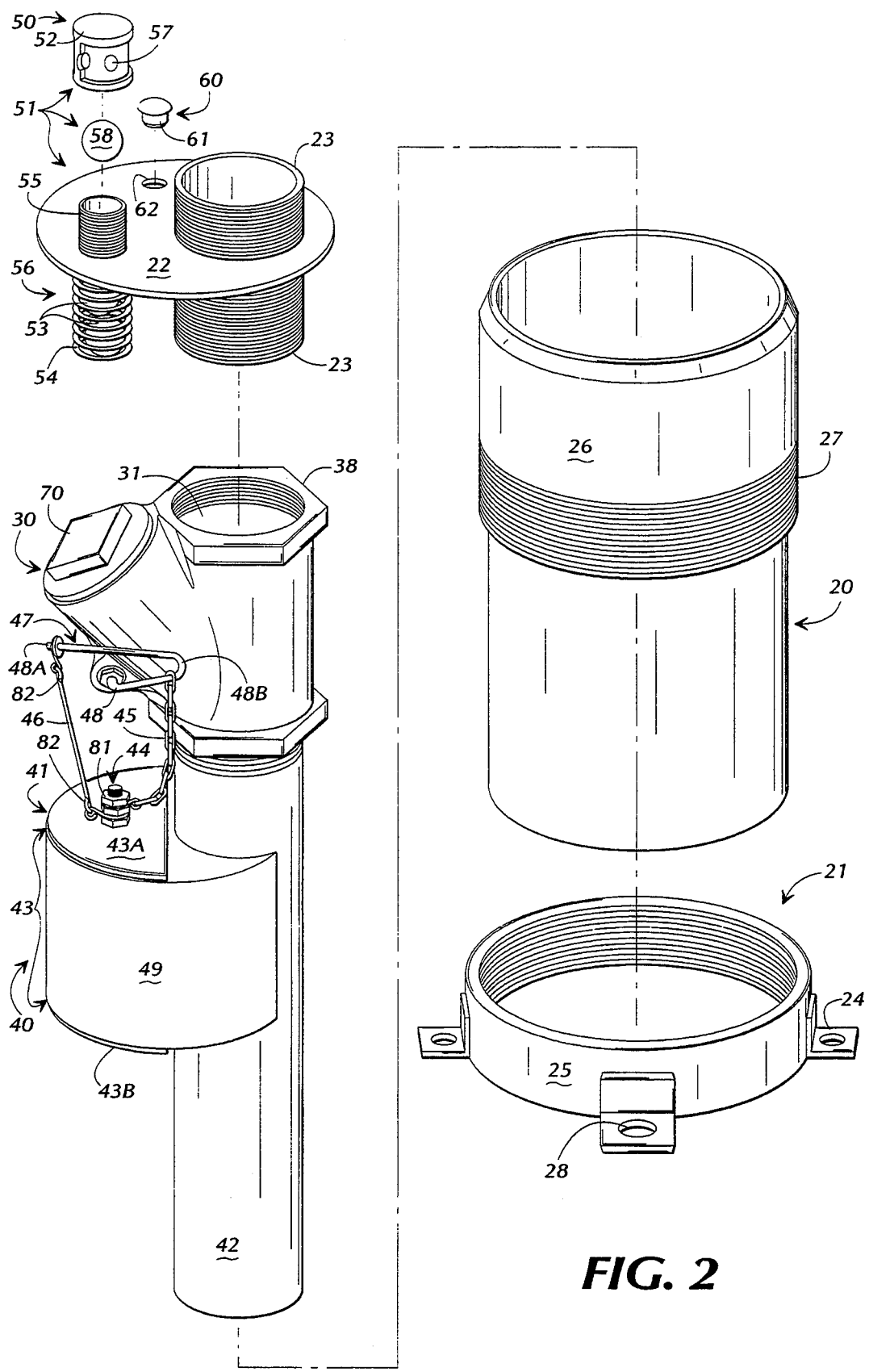
FIG. 2 is an exploded perspective view of the components of the embodiment of FIG. 1 shown as the components of the invention would be assembled into the self-contained unit.

FIG. 1 shows a fully assembled, self-contained, automatic flow control device 10 for attachment to liquid storage receptacles according to an embodiment of the invention. Referring now to FIG. 2, the automatic flow control device 10 comprises generally a housing means 20, a mounting means 21, a valve assembly 30, a float assembly 40, a vapor check/release assembly 50 and a safety valve means 60.

The housing means 20 comprises a tubular sleeve 26 having external threads 27 along a portion of the sleeve 26. Said housing means 20 further comprises a top plate 22 which is secured to the housing sleeve 26 in an air tight manner such as by welding. The top plate 22 receives and rigidly secures a fully threaded inlet tube 23 in such a manner that a portion of the threads of the tube 23 extend above the top plate 22 and a portion of the threads extend below the top plate 22. The threads of the inlet tube 23 which extend above the top plate 22 of the housing means 20 allow for the threadable attachment of a liquid supply hose or pipe to the device 10. The threads of the inlet tube 23 which extend below the top plate 22 are for the threadable attachment of the valve assembly 30. The top plate 22 also receives and secures the vapor check/release assembly 50 and the safety valve means 60, as shown in FIGS. 1 and 2.

The mounting means 21 comprises an internally threaded collar 25 having at least four (4) flange tabs 24 rigidly attached thereto. The flange tabs 24 are provided with bolt holes 28 for receiving mounting bolts (not shown) for attachment of the mounting means 21 to a liquid storage receptacle. To install, an appropriately sized hole is cut into a target storage receptacle and the appropriate number of bolt holes 28 are then aligned, drilled and tapped for receiving the mounting bolts which secures the mounting means 21 to the target receptacle. A gasket (not shown) is used to seal the mounting means 21 against the target receptacle.

Figure 3:
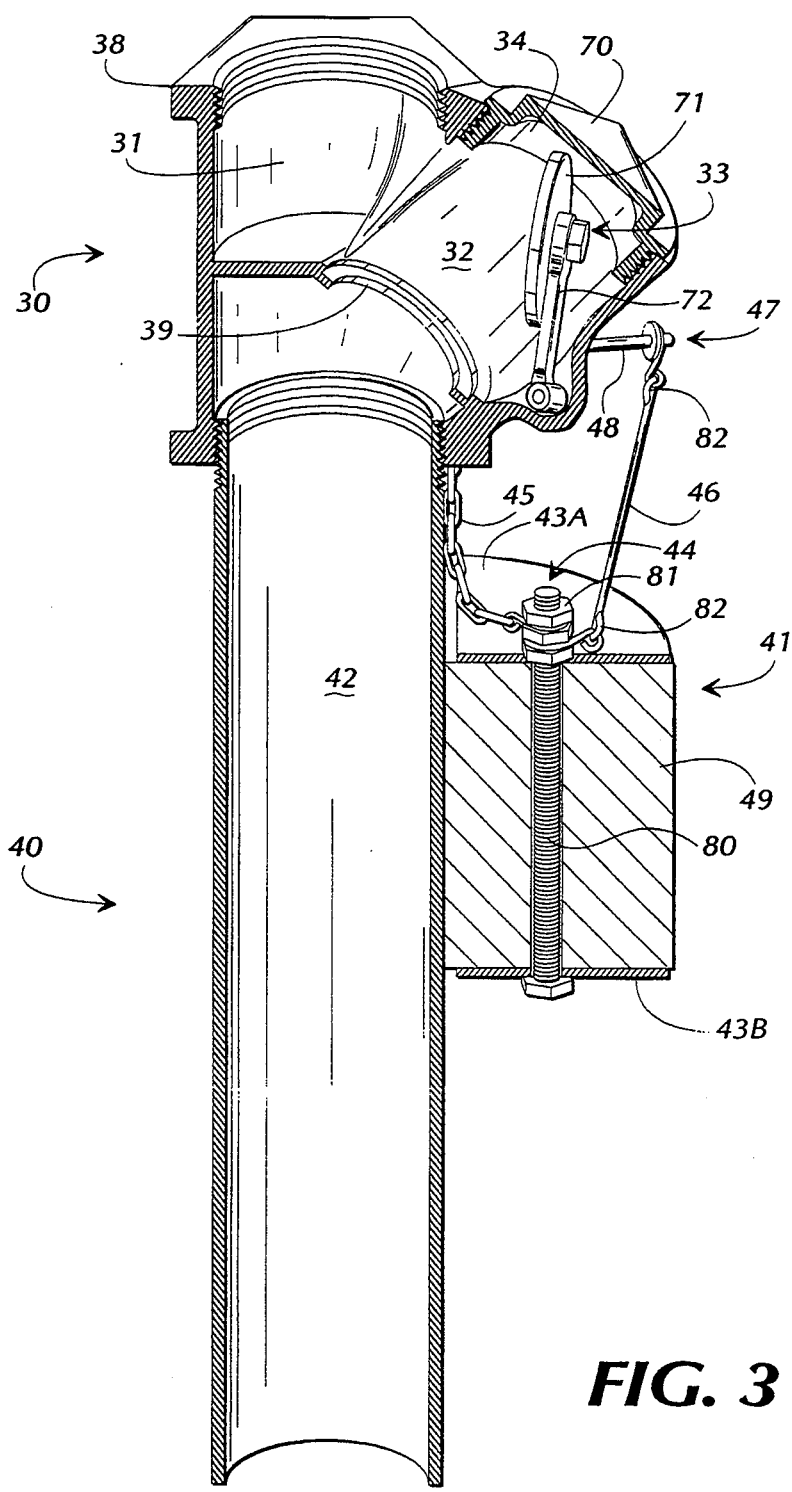
FIG. 3 is a cross-sectional perspective view of the float and valve assembly of the embodiment of FIG. 1.

Referring now specifically to FIG. 3, the valve assembly 30 is of homogeneous construction and comprises a rigid valve body 38 having an inlet chamber 31 and an offset valve chamber 32. The valve body 38 is housed entirely within the housing sleeve 26 and is threadably and securely attached at its upper end to the lower end of the threaded inlet tube 23 as shown in FIG. 2. The offset valve chamber 32 is situated at an approximate 45° angle with respect to the inlet chamber 31 and communicates with said inlet chamber 31 to define a common passageway. The angle of the offset valve chamber 32 greatly reduces wear and extends the life of the valve assembly 30 but has little effect on its flow rate. The valve chamber 32 further comprises a pivotal valve disc assembly 33 and a valve seat 39. The valve chamber 32 is also provided with an access port 34 and cap 70. The valve disc assembly 33 is comprised of a valve disc 71, a pivotal support arm 72, and a control member 47. The valve disc 71 is securely but removeably attached to one end of the pivotal support arm 72. The other end of the support arm 72 is pivotally attached to one end of the control member 47. The control member 47 comprises an elongated rod which serves as an axle or hinge for the rotation and pivotal movement of the valve arm 72 and valve disc 71 between open and closed positions. In its closed position, the valve disc 71 sealably rests against the valve disc seat 39. The control member 47 extends laterally outward from support arm 72 through the wall of the valve body 38. As best shown in FIG. 2, the portion of the control member 47 which extends outwardly through, and is therefore external to, the valve body 38 is bent or shaped in an arcuate manner so as to create a bi-directional, first class, lever means 48 having a free forward arm 48A and a curved inner arm 48B. The fulcrum of the lever means 48 is located at or along the portion of the control member 47 which extends laterally through the wall of the valve body 38 and becomes the axial connection of the control member 47 to the support arm 72. Upward or downward movement of arms 48A, 48B of the lever means 48 causes pivotal movement of the support arm 72 and the valve disc 71 attached thereto. The forward arm 48A of the lever means 48 is operably linked to the float assembly 40 through float linkage 46.

The float assembly 40 constitutes part of the automatic control means for controlling the operation of the valve assembly 30 and is housed substantially within the housing sleeve 26 of the housing means 20. The float assembly 40 comprises a float tube 42 and a float means 41. The float tube 42 is treadably attached at its upper end to the lower or output end of valve assembly 30 and extends beyond the sleeve 26 of housing means 20 as shown in FIG. 1. The float means 41 is operably attached, through the float linkage 46, to the lever means 48 of valve disc assembly 33. The float means 41 comprises a buoyant float body 49, a weighting means 43 and a securing means 44. The float body 49 partially girdles the float tube 42 and is in slidable communication therewith. The weighting means 43 comprises a pair of weighted plates 43A and 43B situated at the top and bottom of the float body 49, respectively, and which generally conform to the shape of the float body 49 as can be best seen in FIG. 3. The plates 43A and 43B are secured to the float body 49 through the securing means 44 and are of sufficient weight, in combination with the dead weight of the float body 49 when not being buoyed and when there is no incoming line pressure on the valve disc assembly 33, to cause the lever member 47 to pivot the valve disc assembly 33 to its open position. The securing means 44 comprises a threaded rod or bolt 80 which extends vertically through the core of the float body 49 and through plates 43A and 43B and is secured thereto by one or more nuts 81. The float linkage 46 extends generally vertically between the valve assembly 30 and the float assembly 40 and is comprised of a rigid rodlike member having looped ends 82. The linkage 46 is attached at one end to the forward arm 48A of the lever means 48 and at the other end to the securing means 44 of the float means 41. A failsafe chain 45 is loosely attached between the valve assembly 30 and the float assembly 40 with one end of the chain 45 being attached to the curved inner arm 48B of the lever means 48 and the other end being attached to the securing means 44 of the float means 41. The connection of the chain 45 in this manner causes the valve disc assembly 33 within valve 30 to automatically close in the event the float linkage 46 breaks or the float means 41 otherwise becomes detached from the forward arm 48A of the lever means 48 during the refilling process.

The vapor check/release assembly 50 is attached to the top plate 22 of the housing means 20 and extends therethrough as shown in FIG. 2. The vapor check/release assembly 50 comprises a external venting means 51 and an internal check valve means 56. The venting means 51 comprises a vent housing 52, a valve ball 58 and a tubular valve seat 55. The valve seat 55 is fully threaded and is rigidly attached to the top side of the housing means 20 and extends through the top plate 22 to the interior of the housing means 20. The vent housing 52 is threadably connected to the valve seat 55 and houses the valve ball 58. Vent holes 57 are provided around the periphery of the vent housing 52 to allow for the escape of vapor or air from within the storage receptacle during the refilling process or as the pressure within the receptacle otherwise rises. The valve ball 58 sealably rests upon the valve seat 55 during periods when venting of the storage receptacle is not required and thereby prevents the introduction of tainted air, or other undesirable gaseous material, into the storage receptacle. The recovery of vented vapors from within the storage receptacle can be accomplished by the removal of the vent housing 52 and the valve ball 58 and the attachment of a vapor recovery hose or pipe (not shown) to the valve seat 55. The internal check valve means 56 is housed within the housing means 20 and comprises a cage means 54 and a pair of buoyant float balls 53. The cage means 54 is attached at its upper end to the top plate 22 of the housing means 20 in vertical alignment with the valve seat 55 of venting means 51. The float balls 53 are housed vertically within the cage means 54 and when buoyed upward prevent the backflow of liquid through the venting means 51 in the event the storage receptacle is situated in an extremely tilted position during the refilling operation.

The safety valve means 60 comprises a pressure sensitive plug 61 which is frictionally inserted into an appropriately sized hole 62 within the top plate 22 of the housing means 20. The plug 61 is designed to relieve pressure from within the storage receptacle during the refilling operation by "popping off" in the event of liquid backflow through the valve assembly 30 and/or the receptacle cannot otherwise be vented through the venting means 51.

In operation, as liquid within the storage receptacle is used or is allowed to leave the receptacle, the falling liquid level within the receptacle causes the float means 41 of the float assembly 40 to slide down the float tube 42. This downward movement of the float means 41 pulls on the float linkage 46 thereby causing the valve disc assembly 33 within the offset valve chamber 32 of the valve assembly 30 to move to its open position. In order to refill the storage receptacle, liquid is introduced or pumped through the inlet tube 23 of the housing means 20. The liquid then flows through the inlet chamber 31 of the valve assembly 30, through the common passageway between the inlet chamber 31 and the offset valve chamber 32, through the open valve of the offset valve chamber 32, through and out of the float tube 42 of the float assembly 40 and into the storage receptacle. During the refilling operation, vapor or air from within the receptacle is allowed to freely vent (or is recovered) through the vapor check/release assembly 50. At a predetermined level, the rising level of liquid within the storage receptacle causes the float means 41 to be buoyed upward thereby causing the float linkage 46 attached to the top of the float means 41 to move against the forward arm 48A of the lever means 48. This action causes the control member 47 to rotate which in turn pivots the support arm 72 of the valve disc assembly 33 thereby initiating the closure of the valve disc 71 against its seat 39. The valve disc 71 is assisted in its closure by the flow of the liquid through the valve assembly 30, however, the angle of the valve chamber 32 with respect to the inlet chamber 31 greatly reduces the velocity of the valve disc 71 during the closing operation by shortening its length of travel. This reduces the impact pressure of the valve disc 71 on the valve seat 39 at closure thereby greatly extending the life of the present invention.

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. A method of automatically managing the filling and refilling of a liquid storage receptacle, including the automatic release of pressure within the receptacle, comprising the steps of:

opening a dual-chambered valve means which is flowably located between a source of liquid and the receptacle, said valve means having an inlet chamber and an offset valve chamber, said offset valve chamber being angularly positioned with respect to said inlet chamber and in flow communication with said inlet chamber so as to define a common flow passageway, introducing said liquid into said valve means whereby the direction of flow of the liquid is first through said inlet chamber and then angularly through the open valve of said angled offset valve chamber, controlling the flow of liquid through said valve means using a valve control means comprising a bi-directional lever mechanism which is operably linked to a sensing means, simultaneously and automatically venting the pressure within the receptacle, sensing the level of liquid within the receptacle using a sensing means, said sensing means comprising a buoyant float body operably linked to said bi-directional lever means of said valve control means, automatically closing the valve means by operation of the valve control means in response to the upward movement of the buoyant float body of said sensing means, automatically terminating the flow of liquid into said receptacle as a result of the automatic closing of said valve means.

2. The method of claim 1, wherein the source of liquid is pressurized.

3. The method of claim 2, wherein said angle between said inlet chamber and said offset valve chamber is approximately 45°.

4. A compact, self-contained, flow control apparatus for automatically controlling the flow of liquid into a liquid storage receptacle and for the automatic release of pressure from within the receptacle, comprising:

a housing means having an inlet tube and a top plate;

a dual-chambered offset valve mechanism attached to the inlet tube of said housing means, said valve mechanism comprising an inlet chamber and an offset valve chamber angularly positioned with respect to said inlet chamber;

a valve control means comprising a bi-directional lever mechanism and control linkage operably connected to a sensing means;

a sensing means for sensing the level of liquid within the receptacle and which is in operative communication with said valve control means, said sensing means comprising a buoyant float body which is in slidable communication with a float guide;

a pressure release means attached to the top plate of said housing means;

a backflow check means attached to the top plate of said housing means; and, a mounting means.

5. The apparatus of claim 4, wherein said housing means comprises an elongated tubular sleeve having external threads along a portion thereof.

6. The apparatus of claim 4, wherein said inlet tube of said housing means is secured vertically through the top plate of said housing means.

7. The apparatus of claim 4, wherein said inlet chamber and said offset chamber communicate to define a common passageway.

8. The apparatus of claim 4, wherein the angle between said offset valve chamber and said inlet chamber is approximately 45°.

9. The apparatus of claim 4, wherein said lever mechanism comprises an elongated rod extending from said valve mechanism and thereafter being bent and cambered so as to form and further comprise a first class, bi-directional, lever means having an internal pivot arm as its fulcrum, a forward lever arm and a curved lever arm.

10. The apparatus of claim 4, wherein said offset valve chamber further comprises a pivotal valve disc and a valve disc seat whereby said pivotal valve disc is operably connected to said valve control means.

11. The apparatus of claim 4, wherein said sensing means comprises a buoyant float body in slidable communication with a float guide.

12. The apparatus of claim 4, wherein said pressure release means comprises an automatic vent valve comprising:

a perforated vent housing;

a weighted sphere moveable contained within the space of said vent housing; and, a tubular valve seat for receiving said weighted sphere.

13. The apparatus of claim 4, wherein said backflow check means comprises:

a cage means; and, one or more buoyant float spheres moveably contained within said cage means.

14. The apparatus of claim 4, wherein said pressure release means are in vertical and operative alignment with each other.

15. The apparatus of claim 4, wherein said mounting means comprises an internally threaded collar having a plurality of mounting tabs attached thereto.

16. A compact, self-contained, flow control apparatus for automatically controlling the flow of liquid into a liquid storage receptacle and for the release of pressure from within the receptacle, comprising:

a housing means comprising:

a tubular sleeve; and, an end plate rigidly attached to one end of said sleeve for receiving and securing an inlet tube, a vapor check/release assembly comprising a venting means, a check valve means, and a safety valve means;

a dual-chambered offset valve assembly connected to and in flow communication with the inlet tube of the housing means comprising:

an inlet chamber; and, an offset valve chamber which is angularly situated with respect to said inlet chamber and comprising:

a valve disc;

a support arm attached to said valve disc for pivotal movement of said disc from an open position to a closed position against a valve seat;

a valve seat for sealably receiving the valve disc in its closed position; and, a valve control means connected to said support arm for pivotal movement of the valve disc between its open and closed positions;

a float assembly operably connected to the valve control means of the dual-chambered offset valve assembly comprising:

an elongated float tube which is attached to, and in flow communication with, the valve assembly, and, a float means, comprising a weighted, buoyant, float body, said body being operably linked to the valve control means of the valve assembly and being in slidable communication with said float tube;

linkage means comprising:

a rigid rod member operably attached at one end to the float body of said float assembly and at the other end to the control means of said valve assembly; and, a failsafe connecting member which is loosely attached at one end to the float body of said float assembly and at the other end to the control means of said dual-chambered valve assembly in a manner which causes the valve disc of said valve assembly to close in the event the rigid rod member connecting the float body to the control means becomes detached or broken;

a mounting means, rigidly attached to said receptacle, for receiving and securing the housing means to said storage receptacle comprising:

an internally threaded collar for receiving and securing said housing means, and, a plurality of flange tabs for rigid attachment of said collar to a liquid storage receptacle.

17. The apparatus of claim 16, wherein said housing means further comprises external threads along a portion of said tubular sleeve for threadable connection with said mounting means.

18. The apparatus of claim 16, wherein said inlet tube of said housing means further comprises external threads along the entire length of said tube.

19. The apparatus of claim 16, wherein the venting means of said vapor check/release assembly of said housing means comprises a perforated vent housing for receiving a weighted sphere, and, a tubular valve seat extending through the end plate of said housing means for receiving said weighted sphere and for securing the perforated vent housing to the top side of said housing end plate.

20. The apparatus of claim 16 wherein said check valve means comprises a cage means for housing a pair of buoyant float spheres, said cage means being securely attached to the bottom side of the end plate of said housing means and being in vertical alignment with the tubular valve seat of said venting means.

21. The apparatus of claim 16, wherein said safety valve means of said housing means comprises a pressure sensitive plug which is frictionally inserted through a hole in the end plate of said housing means.

22. The apparatus of claim 16, wherein said angle between said offset valve chamber and said inlet chamber is approximately 45°.

23. The apparatus of claim 16, wherein said valve control means for pivotal movement of said valve disc comprises an elongated rod which extends through the wall of said valve body and is thereafter bent and cambered so as to form and create a lever means comprising:
a free forward arm; and,
a curved inner arm.

24. The apparatus of claim 23, wherein said lever means defines a bi-directional, first class, lever with its fulcrum being located at or along the portion of said rod which extends through the wall of said valve body.

* * * * *